United States Patent Office 3,355,275
Patented Nov. 28, 1967

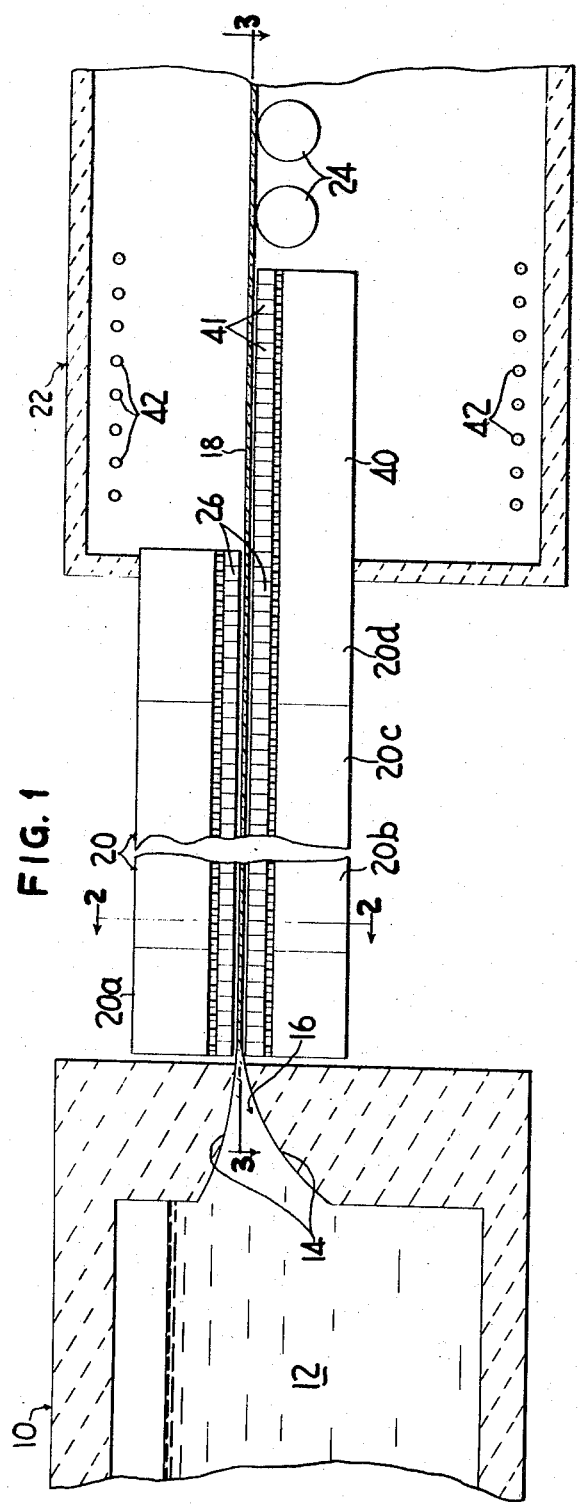

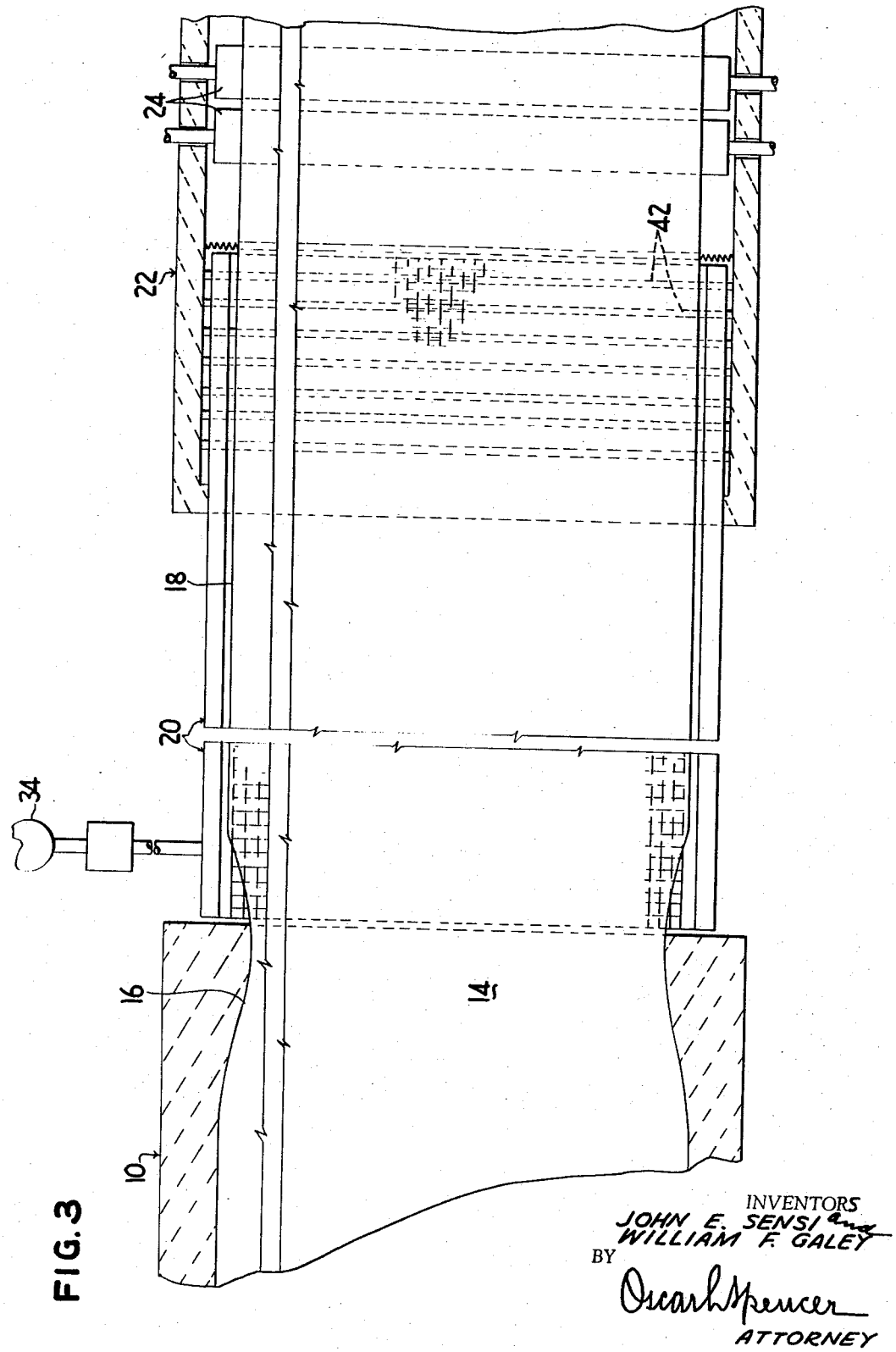

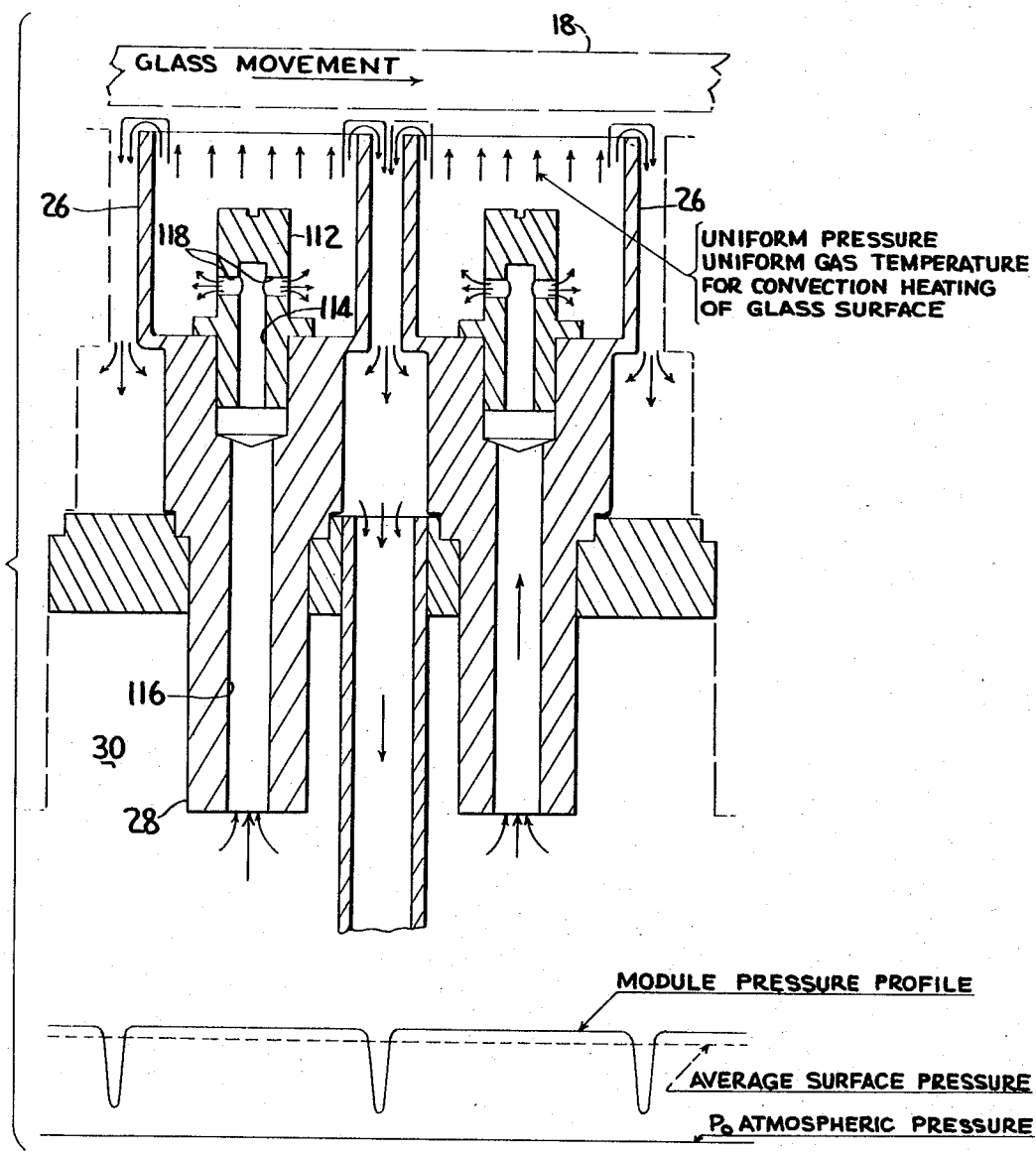

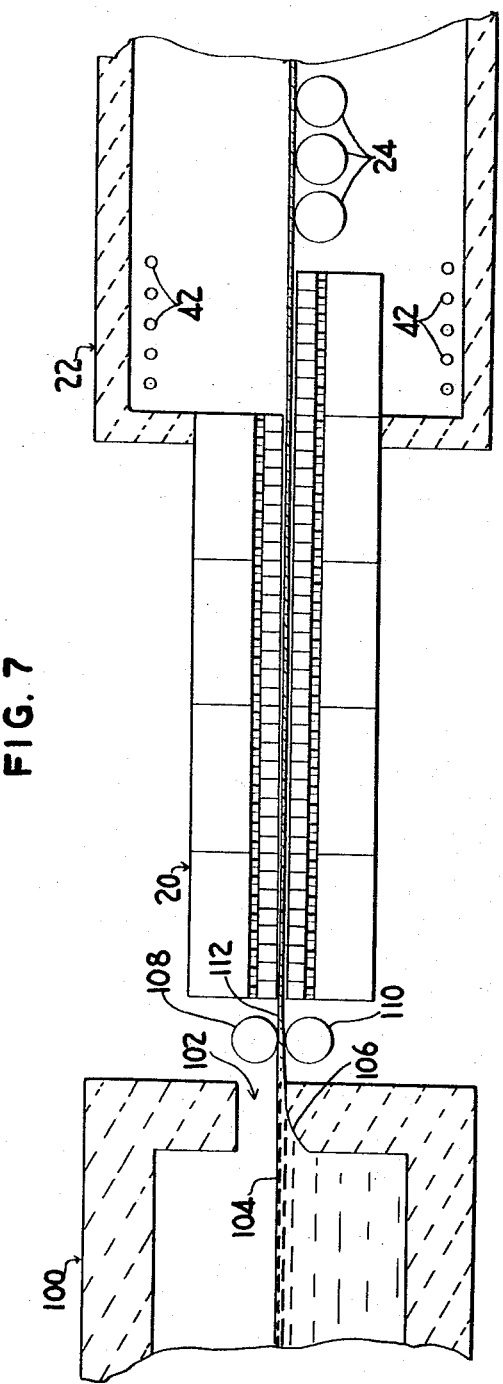

3,355,275
METHOD OF FORMING A GLASS RIBBON ON A GAS SUPPORT BED
John E. Sensi, Arnold, and William F. Galey, Saxonburg, Pa., assignors to Pittsburgh Plate Glass Company, Pittsburgh, Pa., a corporation of Pennsylvania
Filed May 24, 1963, Ser. No. 283,011
4 Claims. (Cl. 65—99)

ABSTRACT OF THE DISCLOSURE

Flat glass sheets of a selected width are formed by depositing a mass of molten glass on a gaseous support which exerts an upward supporting pressure thereupon. The gas providing the supporting pressure is heated to a temperature which maintains the glass molten throughout and the glass flows laterally on the gaseous support to a selected width at which the glass is cooled and the sheet removed from the support.

---

This application relates to a method and apparatus for forming glass in sheet or ribbon form.

Flat glass is a generic description of several varieties of glass in sheet, plate or ribbon configuration. Plate glass is that glass which is formed into a ribbon by forming rolls and which is subsequently ground and polished to ultimate flatness and surface perfection. It is the highest quality flat glass produced and is used where optical perfection is required.

Another type of flat glass is known in the industry as sheet or window glass. The surfaces of sheet glass exhibit fire-finished surfaces, but complete optical perfection is generally not achieved because of "pattern" exhibited in the sheet. Pattern is a wave formation caused by unequal transverse cooling and, thus, unequal attenuation of the glass ribbon during formation. Other optical imperfections may exist in the sheet glass depending upon the particular process, of which there are three major ones, by which the glass is made.

According to this invention, a new method of producing glass in ribbon or sheet form has been provided. In the practice of this process, glass is dispersed on a gaseous support and is held at a temperature at which it will flow, either by itself or under the influence of a fluid pressure applied to the upper surface thereof. The glass is then allowed to flow and to seek its own width without restricting the edges. Ultimately, it reaches a width dependent upon the fluid pressure applied.

By supplying the glass either as a molten stream or as a preformed ribbon to one end of the gaseous support and moving the glass along the support, pulling it away from the other end, a flat, well-formed, continuous ribbon with good surface is produced.

In a preferred embodiment of the invention a pair of superposed, parallel gas pressure zones are established, the glass being delivered to and supported by the lower zone and its upper surface being subjected to the pressure of the upper zone. The temperature of the gas of the opposed zones at the entry end thereof is held high enough to render the glass supported by the gas in a plastic or flowable condition.

The length of these bed sections is long enough (2 feet or more measured in the direction of movement of the ribbon) so that during passage of the ribbon between the superimposed zones, the ribbon takes a natural width (the edges of the ribbon being left unrestrained) and the surfaces have a low incidence of defects.

After this has occurred the glass is allowed to cool and to solidify. This preferably is accomplished by passing the flattened ribbon between further opposed beds where the gas is cooler and the glass is cooled by the gas of the pressure zone. In such a case the temperature of the gas normally is held above about 600° F., usually not less than about 800 to 1000° F., in order to control the rate of cooling properly.

The pressure zones are created by directing a plurality of individual streams of gas into the space between the beds and the glass through a plurality of inlets extending through the bed. To avoid direct impingement of high velocity streams of gas against the glass and thereby to mar the glass, the gas entering the space is diffused or directed in a lateral direction. This may be accomplished by passing the gas into modules or local zones in a direction substantially in a direction parallel to the direction of movement of the ribbon as described hereinafter in greater detail.

Also provided, as explained below, are a plurality of exhaust outlets, usually providing exhaust area less than 50 percent of the combined exhaust and support areas, so that a substantially flat pressure profile is attained and air flow into and out of the space occurs at a plurality of points between the side edges of the ribbon.

This gas creates a pressure between the under side of the ribbon and the bed, thus supporting the ribbon, which remains spaced from the solid portions of the bed.

The bed opposed to the upper surface of the ribbon creates a body of gas in the space therebetween. In the preferred practice of the process contemplated here, the upper bed is urged toward the ribbon by a small pressure which is low enough to avoid forcing the ribbon against a solid surface but, nevertheless, is enough to depress the ribbon below the level it would normally seek if pressure were applied only to its lower surface. Thus, the space between the glass and the bed is decreased substantially by the depression due to applied pressure from the upper bed.

By urging the two beds together in this way the glass tends to flatten out. If a thick ribbon or mass of glass is fed between the beds and the pressure applied, as above, the glass tends to thin out to a uniform or equilibrium thickness, as the glass is held in flowable state.

Advantageously, the upper bed may be narrower than the width of the ribbon so that the outer edges of the ribbon extend beyond the margins of the upper bed.

After the glass has reached the desired thickness and degree of freedom from defects, it is cooled to a temperature at which it is rigid and then is fed into an annealing lehr.

This annealing lehr may be of conventional construction with the exception of a gaseous supporting arrangement at least in the entrance end thereof, so as to avoid damage to the glass ribbon from contact with mechanical apparatus. The lehr supporting arrangement may include only a lower supporting head or both upper and lower heads depending upon the temperature of the glass ribbon passing thereover. A conventional roll conveyor follows the air film supporting device within the lehr for positive contact with the glass after the glass has cooled to a temperature at which its surface can be handled without damage.

In some cases, positive gripping means, such as pinch rolls at the exit end of the lehr, for drawing and thus attenuating the ribbon may be required. In other cases, the driving mechanism of the annealing lehr will suffice for applying a tractive force to the glass ribbon.

Another aspect of this invention is the formation of a ribbon of determined thickness, as by using forming rolls of known type followed by treating the formed ribbon to surface it and also to size it to a thickness differing from that formed by the forming rolls.

To further understand the invention, attention is directed to the accompanying drawings, in which:

FIG. 1 is a diagrammatic view in elevation of a longitudinal section through one embodiment of apparatus for a surfaced ribbon of glass according to this invention;

FIG. 2 is a cross-sectional view of enlarged scale taken on line 2—2 of FIG. 1;

FIG. 3 is a diagrammatic plan view taken on line 3—3 of FIG. 1;

FIG. 4 is a schematic view on an enlarged scale of a section of the gas sizing and supporting bed showing diagrammatically the flow and exhaust of the gases and presenting diagrammatic graphs in conjunction therewith;

FIG. 5 is a plan view on an enlarged scale of another type module unit which is subdivided by partitions;

FIG. 6 is a section taken along lines 6—6 of FIG. 5;

FIG. 7 is a diagrammatic view in elevation of a modified form of apparatus for producing a ribbon according to this invention; and FIG. 8 is a diagrammatic plan view of a typical attenuation zone, if such is required.

One apparatus for forming, sizing and surfacing a glass ribbon is illustrated in FIGS. 1 to 3, to which attention is now directed. There is illustrated the discharge end of a glass melting tank 10 containing a bath of molten glass 12. The tank 10 is provided with submerged, converging discharge lips 14 through which glass flows as a ribbon-like stream 16 to be sized and surfaced into a stabilized ribbon 18. If desired, sizing rolls (not shown) may be provided at the discharge lips in order to form and size the ribbon. However, the molten glass may be delivered directly to the sizing apparatus.

The stream 16 flows into and through a sizing and surfacing apparatus 20 and into and through an annealing lehr 22. The entrance section of the annealing lehr 22 is in effect a continuation of the sizing and surfacing means 18 except that temperature conditions are different followed by conventional rolls 24 which provide the tractive force for withdrawing the ribbon 18 therethrough and also through the apparatus 20.

The apparatus 20 includes upper and lower flat, horizontal gas discharge beds divided into a number of sections 20a, 20b, etc., for heat gradient establishment and control purposes. Structurally, each section, whether upper or lower portion, is identical in construction. Each portion includes a plurality of modules 26 in spaced but close juxtaposition each to the other and arranged geometrically like a mosaic. In the illustrated embodiment, all modules 26 have their outer termini of rectangular configuration and lying in a common plane. The modules 26 are arranged in successive rows crossing the intended path of travel of the stream of glass 16 or the sized ribbon 18, as the case may be. As is illustrated, each row is at an angle of substantially 90 degrees from the path of travel of the glass and spaced close to the next adjacent row as hereinafter described in more detail. See especially FIG. 3.

Of course, the rows of modules may be angularly arranged with respect to the path of travel of the glass without departing from the spirit of the invention.

Each module 26 (see FIGS. 2 and 4) has a stem 28 of smaller cross-sectional area than the outer terminus and each opens into a plenum chamber 30 positioned below or above the bed (as the case may be) and acting as a support therefor. See FIG. 2. Each module is substantially enclosed and separated from other modules by an exhaust zone identified as 32 on the drawings. See especially FIG. 2.

A gas, such as air, is supplied to the plenum chamber 30 by a blower 34 under a positive pressure sufficient to stabilize the plane of the glass and above and below, respectively, the upper and lower module beds. In order to maintain the desired temperature in each section of the apparatus 18, the gas is preheated prior to being pumped into the plenum. A heater 36 such as a so-called direct-fluid heater or other well-known gas heater is used to preheat the gas. Because such heating means are known and details are unnecessary to understand this invention, no detailed description or drawing of the heater 26 is presented.

Exhaust gas flows through exhaust spaces and then through exhaust conduits 38 to the atmosphere. In order to effect economy of operation, the relatively hot exhaust gas may be recycled to the heating means, pump and plenum.

The gaseous supporting and treating apparatus is highly developed and refined and is such to prevent the distortion, i.e., deviation from flatness, warping, etc., of glass at temperatures where the glass can actually flow. A uniform force applied to the glass over the major portion (at least 75 percent of its surface) is important. This prohibits flowing the gas used for sizing and surfacing across substantial areas of the glass and the establishment of a progressive pressure drop along the path of gas flow. The gas introduced from a plurality of locations must be exhausted without a mass lateral flow to the edges of the glass to prevent a pressure build-up centrally of the glass that will cause a doming effect on the glass. Thus, the gas is exhausted inwardly of the modules and flows through the exhaust channels to gas exhausting ducts 38.

To achieve uniform pressure, the gas discharge zone areas and the exhaust zone area are chosen so as to provide substantially uniform gas discharge pressure, at any location, on the glass. The difference between the gas discharge and exhaust pressures must not be too great in order to prevent deformation of the glass.

It is important that the gas is not discharged directly onto the glass so as to dimple the glass. The gas is thus diffused so as not to directly impinge localized jets of gas against the deformable glass.

The module embodiments illustrated in FIGS. 4, 5 and 6 when assembled as described and suitably supplied with gas from a plenum chamber in a manner to be described in more detail, provide the uniform pressure profile required to process glass at elevated temperatures substantially free from distortion in the manner herein described.

As shown in FIG. 4, each module 26 forms an open-topped chamber, being essentially closed on its other sides, the outer terminus of which defines a zone of substantially uniform pressure, a profile of which is diagrammatically shown in FIG. 4 beneath or above, as the case may be, the glass. The pressure is exerted by gas supplied to each module from the supporting plenum chamber 30 by way of the hollow supporting stem 28. A nozzle 112, in threaded engagement with an opening in the base of the module 26 and having a bore 114 connected with the bore 116 of the module stem 28, provides a gas inlet to the module chamber and also functions to diffuse the gas by changing the direction of flow to a horizontal direction as the gas escapes and expands into the module chamber through a plurality of bores or orifices 118 in the nozzle. The orifices are so disposed to prevent direct impingement of pressurized gas against the glass surfaces so as to prevent dimpling of the glass from the velocity pressure of a localized jet of gas. They deliver the gas to the module in a path which is initially out of the path of the glass. As shown in FIG. 4, the initial path is toward the module side wall below the outer edge thereof. However, the initial path may be downward, or as a horizontal spiral, or may be baffled or otherwise obstructed as long as it does not initially impinge against the glass. By feeding the gas into the large module chamber through a conduit or orifice which is smaller in cross-section than the module, the gas diffuses into the gas of the chamber, producing a diffused flow, thus insuring uniform pressure across the outer edges of the module.

Pressure profiles across the outer terminus of a module may be determined in the following manner. A pressure sensing plate having a small hole therethrough is positioned above a module and spaced from the upper terminus thereof a distance corresponding to the spacing therefrom of the glass, e.g., 0.010 inch. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along, e.g., the Y-axis of the graph. A potentiometer, the shaft of which is rotated by relative horizontal movement between the sensing plate and the module, translates such movement to an electrical signal which controls the displacement of the recording device along the other, or X-axis, of the graph.

Most advantageously, the relatively small size of orifices 118 of nozzle 112 provides a drop in gas pressure from the interior of the plenum to the interior of the module, and in so doing, performs three important functions; first, it prevents modules not covered by the glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the outer terminus of the module and the adjacent surface of the glass becomes self-adjusting to a uniform size about the entire outer periphery of the module, which size is a function, as regards the lower module beds, of the weight of the glass supported plus the pressure of the gas applied to the top surface of the glass. This occurs because the flow of gas from the plenum through the module and to the exhaust area passes through two restrictions: the orifices 118 in the base of each module, and the gap between the upper terminus of the module and the glass. Because the gap is normally quite large with respect to the orifices 118, there will be a substantially constant pressure drop through the orifices from the plenum to the module. The pressure per unit area of cross-section across the module is, under normal equilibrium conditions as regards the lower module bed, equal to the weight per unit area of supported surface of the glass which it supports plus the pressure applied to the upper surface of the glass from the upper bed, the gap between the lower module and the glass adjusting in size (i.e., changing the height of support of the glass from the module) until this pressure is obtained.

Thus, if the gap becomes very small due to a heavy piece of glass, or an external force upon the glass, or a change in applied pressure, the pressure within the module will increase until the pressure balances the load or until plenum pressure is reached as the gap approaches zero. If the gap diminishes to zero there is, of course, insufficient pressure to support the load. The glass will be raised from the module by the gas in the module impinging against the lower surface of the glass under any module pressure greater than the weight of the glass plus that pressure applied to the top surface of the glass, thus increasing the size of the gap and reducing the module pressure. In this manner the gap is self-adjusting to a uniform size, dependent upon the weight of the glass plus the pressure of the gas applied to the upper surface, the plenum pressure and the size of the orifices. The rate at which the pressure within the module builds up with decrease in gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the module edges.

Modules of small volume are more responsive for this purpose than are larger modules for a given flow rate. Generally, the modules herein contemplated have a volume less than about 2 cubic inches, especially when opposite the molten bottom surface of the glass. By forming the support bed from identically constructed modules and supplying them with uniform pressure, each module will support the overlying portions of the glass along a desired surface. The proximity of adjacent modules results in substantially uniform support under the entire area of the glass and substantially uniform pressure above the entire area of the glass to assure a product substantially free of distortion and of desired thickness and finish.

As shown in FIG. 4, the gas within each module escapes across the outer terminus of the module walls to zones of lower pressure between adjacent modules. This lateral flow of gas between the module wall and the glass results in a progressive pressure drop across the width of the wall. However, the resulting area of non-uniform pressure directly above the wall thickness and the area of reduced pressure at the exhaust zones between the modules is minimized by utilizing thin module walls (rarely averaging greater than ⅜ inch) and relatively low gas flow which permits the exhaust area between the modules to be kept small yet adequate to exhaust the gas without building up back pressure. This is shown by the module pressure profile of FIG. 4 wherein the dips shown in the pressure profile at the exhaust areas are sufficiently small to have no adverse effect on the moving glass. Thus, a substantially uniform average support pressure is achieved, as shown in dotted line in FIG. 4.

Each module 26 of the embodiment shown in FIG. 4 is square and exhausts radially in all directions to the surrounding zones of lower pressure, resulting in the pressure profile shown. The pressure over the exhaust areas, while lower than the support pressure, generally is slightly above ambient pressure to provide a gas flow from the supported surface to the exhaust channel beneath the modules.

The modules of the embodiments disclosed herein may vary in size, depending upon such considerations as the size of the glass sheets being produced, so that because of the molten condition of the glass, square modules having outer dimensions of approximately one inch have been found to be generally satisfactory. The module size may vary in dimensions from about ⅛ to 1½ inches on each side. They need not be square, there being numerous other geometric or irregular shapes equally suitable. Generally, the glass should be spaced 0.015 inch from a module bed, especially the bottom bed, but may be spaced 0.005 to 0.050 inch therefrom with equally good results. The module depth from the bottom to the outer periphery may vary but must be substantial. Normally, it will be at least ¼ inch deep and in most cases ½ to 1 inch or more.

Another embodiment of a module suitable for the purposes of this invention is illustrated in FIGS. 5 and 6. This module 120 is subdivided into four cavities 122, 124, 126 and 128, each of which is supplied with gas from an orifice 130 connected to the plenum chamber through hollow stem 132. Each cavity functions, in effect, as a submodule and the pressure profile across the entire internal width of module is substantially flat with the advantage that support is provided as the traveling workpiece covers any one submodule and before the entire unit is covered.

As will be seen from the above, as well as from the pressure profile illustrated in FIG. 4, the bed in its operation develops a uniform pressure under a major portion of the supported glass surface. Thus, the pressure developed over the module cavity does not differ greatly from that over the module walls, while a sharp dip in pressure takes place over the exhaust area. As a general rule the area of low pressure over the exhaust areas should not exceed 50 percent of the area of the bed and preferably should be below 10 percent of the bed area. In other words, the amount of exhaust should be held as low as possible to provide a substantially flat positive pressure profile and sufficient exhaust so that doming of the ribbon does not occur by mass discharge of the gas at the edges of the ribbon.

In the typical practice of this invention, a ribbon-like stream of soda-lima glass is delivered into a sizing and surfacing device at which it will flow readily, for example, at least 1800° F.; rarely above 2200° F. A gas, usually air, is delivered to the bottom plenum chamber at a temperature high enough to hold the glass flowable, or, if necessary, to raise the temperature of the glass to a temperature at which it flows. Conveniently, gas at a temperature of 1500 to 2000° F. and at a pressure of 2 to 10 pounds per square inch is so delivered. Air is also delivered to the top plenum chamber at a temperature in the same range and at a slightly less pressure, differing only by the weight of the glass between the top and bottom module beds. The pressure in the upper and lower module will be 2 to 4 ounces less than in the plenum chamber because of the pressure drop thereinto. The glass, subjected to this temperature and pressure, will assume its equilibrium thickness of approximately 0.305 inch and have smooth, substantially planar and parallel surfaces within about 4 minutes. Thus, the ribbon is moved between the module bed long enough to provide the desired resilience time and to allow the glass to flow to its equilibrium thickness at which it will stabilize. Thereafter, the ribbon is gradually cooled and annealed.

The stream of glass fed between the beds may be relatively thick and more narrow than the bed. In that case the stream widens and thins out as the heating is continued and the ribbon moves forward. If desired, the front portion of the bed may be tilted in the direction of ribbon movement in order to expedite flow of the glass and to speed its spreading out. Alternatively, the stream of glass may be of the same width and thickness as desired to enter the annealing lehr or may be thinner and wider.

The process can be conducted without urging the upper bed downward and in such a case the upper modules simply serve as a source of heat. Under these circumstances the thickness of the glass formed is about 0.305 inch. This may be reduced by rapidly drawing the glass away from the end of the high temperature section and during cooling in order to attenuate it and draw it down to lower thickness. To facilitate this attenuation the edges of the glass may be cooled and gripped by rapidly moving stub rolls which increase the rate of movement of the glass and thereby attenuate it to a reduced thickness. Such apparatus is shown diagrammatically in FIG. 8, wherein stub rolls R grip the glass. The rolls R are driven by suitable driving means, not shown.

The reduction in thickness can be effected by applying pressure by means of the upper bed. In this case the upper bed is moved close enough so that the space between the lower bed and the supported glass is reduced a substantial amount, usually at least 10 but not more than 90 percent of its normal spacing when no upper pressure is applied. The pressure then causes the glass to thin out or to reach a lower equilibrium thickness. In some cases the exhaust area can be dispensed with in the upper bed, the modules simply being spaced side by side, each being in communication with the plenum chamber. Furthermore, the upper bed may be more narrow than the supported ribbon so that a portion of the supported glass extends beyond the edges of the upper bed.

The glass ribbon, after treatment within the apparatus 20, is then delivered to the annealing lehr 22 wherein it is annealed prior to cutting into discrete sheets. In order to support the ribbon of glass 18 against deformation and to protect it against surface damage, the initial supporting arrangement includes an air film supporting bed 40. This air film supporting bed is actually a continuation of the lower portion of the sizing and surfacing apparatus 20 and includes modules 41, a plenum chamber to which heated gas is delivered together with the necessary pump and heating means, not specifically shown in detail.

After the temperature of the glass has been reduced to a value at which the glass may be handled without damage to its surfaces, it passes from the gas film support bed 38 onto conventional conveyor rolls 24. Heating means, such as glow-bars 42, electrically energized, are disposed near the top and bottom of the lehr and across its width. The temperature of the lehr may thereby be controlled, as desired.

The rolls 24 of the lehr 22 also serve to supply the tractive force required to draw the glass through the sizing and surfacing means 20 and, of course, the lehr 22. Initially, a bait in the form of a relatively thin, elongated sheet of metal is inserted within the tank 10 between the lips 14 and is drawn through the apparatus 20 and the lehr 22. Glass adheres to the end of the bait and is drawn from the tank as a ribbon-like stream for treatment.

Another embodiment of the invention is illustrated in FIG. 7, to which attention is directed. Here is illustrated the glass tank 100 having a modified lip structure generally identified as 102. The molten glass 104 discharges over the lower lip 106 into the bite of a pair of water-cooled forming rolls 108, 110 which may be of conventional construction with knurled surfaces. A ribbon of glass 112 is thus formed by the rolls 108, 110 and is delivered into apparatus 20 and an annealing lehr 22. The apparatus 20 and lehr 22 are identical in construction to those previously described and require no further description. In this case, however, the ribbon may need to be heated in order to put it in a flowable condition. The finished glass ribbon is delivered from the lehr for subsequent cutting, etc.

In both of the embodiments described, the glass ribbon is exposed to a temperature above its melting temperature within the sizing and surfacing apparatus 20 and the gas pressure flowing through the modules is sufficient to support the molten glass out of contact with the apparatus and modify and stabilize its thickness as desired. Because the gas pressure is substantially uniformly applied to the glass surfaces, and because of the surface tension to the molten glass, smooth, flat, defect-free surfaces are produced. The knurl pattern from the forming rolls 108, 110, in the FIG. 7 embodiment is eliminated during the sizing and surfacing treatment. The temperature to which the glass is exposed during its passage through 20 will gradually be reduced from entrance to exit so as to deliver a stabilized ribbon of glass to the lehr 22 for annealing.

It is also possible within the scope of this invention to maintain gas pressures and temperatures on the glass for a sufficient length of time to permit the glass to assume its equilibrium thickness of approximately .305 inch and thereafter to increase the gas pressure while maintaining the temperature coupled with an increase in pulling force to produce a final glass thickness less than equilibrium thickness.

Although the present invention has been described with particular reference to specific details thereof, it is not intended that such details shall be regarded as limitations upon the scope of the invention except insofar as included in the accompanying claims.

We claim:
1. A method of forming glass sheets which comprises:
establishing above a flat forming surface a gaseous support capable of exerting an upward supporting pressure on a mass of molten glass when disposed thereon,
applying a mass of molten glass on said gaseous support to form a ribbon having lateral edges, heating said gas of said support to a temperature sufficient to maintain said glass molten and flowable throughout, flowing said molten glass laterally until it reaches a selected width, thereafter cooling said glass at said selected width to a temperature below the melting temperature of the glass, and removing said cooled glass from said gaseous support.

2. A method as recited in claim 1 wherein said glass flows laterally to its equilibrium thickness.

3. A method as recited in claim 1 further including: applying gaseous discharge to the upper surface of the supported molten glass, said gaseous discharge having a temperature of at least the melting temperature of said glass.

4. A method as recited in claim 3 wherein said ribbon flows laterally to a thickness less than its equilibrium thickness.

References Cited

UNITED STATES PATENTS

| | | | |
|---|---|---|---|
| 887,623 | 5/1908 | Gobbe | 65—182 |
| 3,222,154 | 12/1965 | Pilkington | 65—182 |
| 3,223,501 | 12/1965 | Fredely et al. | 65—182 |
| 3,241,937 | 3/1966 | Michalik et al. | 65—65 |

DONALL H. SYLVESTER, *Primary Examiner.*

S. LEON BASHORE, *Examiner.*

D. CRUPIAN, A. D. KELLOGG, *Assistant Examiner.*